United States Patent [19]

Schulze

[11] 4,277,241
[45] Jul. 7, 1981

[54] APPARATUS FOR FORMING BAGS OF THERMOPLASTIC MATERIAL

[75] Inventor: Ehrhart Schulze, Fellbach, Fed. Rep. of Germany

[73] Assignee: Karl Heinz Stiegler, Stuttgart, Fed. Rep. of Germany

[21] Appl. No.: 42,160

[22] Filed: May 24, 1979

[30] Foreign Application Priority Data

Jun. 7, 1978 [DE] Fed. Rep. of Germany ....... 2824989

[51] Int. Cl.³ .............................................. B31B 1/14
[52] U.S. Cl. .................................... 493/196; 156/257; 156/510; 156/535; 493/227; 493/34 R; 493/370; 493/927
[58] Field of Search ............... 93/33 H, 35 R, 84 TW, 93/35 DS, DIG. 1; 156/257, 510, 535; 83/861

[56] References Cited

U.S. PATENT DOCUMENTS

| | | | |
|---|---|---|---|
| 3,417,675 | 12/1968 | Ausnit | 93/33 H UX |
| 3,543,379 | 12/1970 | Naito | 93/84 TW |
| 3,857,329 | 12/1974 | Lehmacher et al. | 93/33 H X |
| 3,986,914 | 10/1976 | Howard | 93/33 H X |
| 4,055,109 | 10/1977 | Kan | 93/33 H X |
| 4,094,729 | 6/1978 | Boccia | 93/33 H X |
| 4,138,932 | 2/1979 | Mowli et al. | 93/33 H X |

Primary Examiner—James F. Coan
Attorney, Agent, or Firm—Thomas R. Morrison

[57] ABSTRACT

In an apparatus for forming and separating the side edges of plastic bags of the type which have opposed interlocking closure strips, an intermittent transport device transports a half-tube of thermoplastic sheeting to a welding device. The sheeting is stopped while welding is performed. At a milling station upstream of the welding device, a milling apparatus is actuated while the half-tube is stopped to mill off a short length of each of the opposed closure strips at a position which coincides with the position at which welding will later be performed.

10 Claims, 6 Drawing Figures

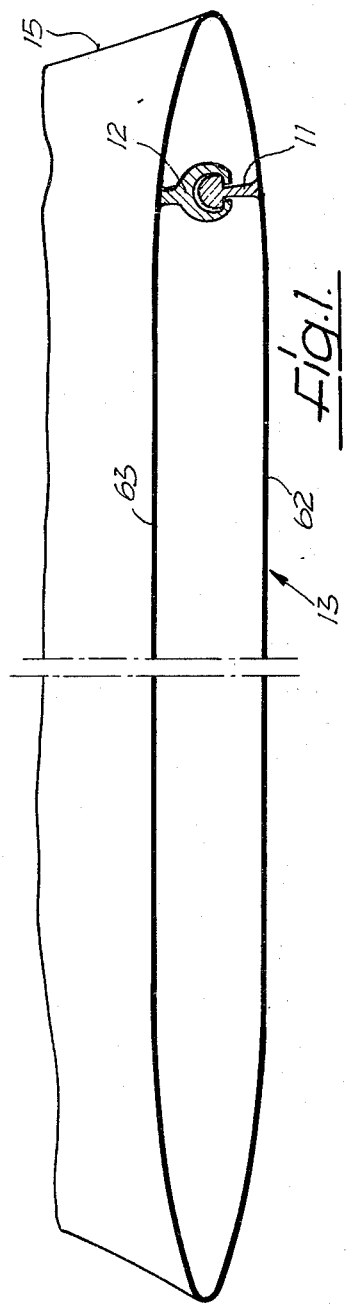
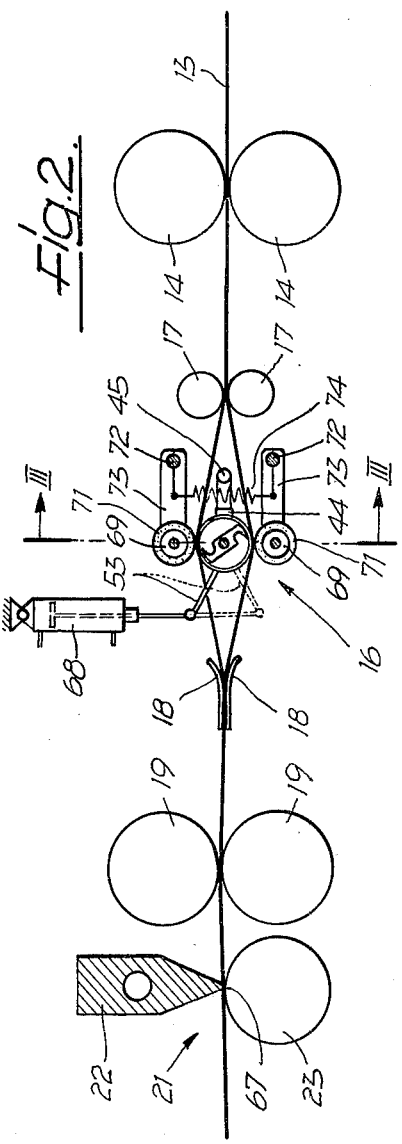

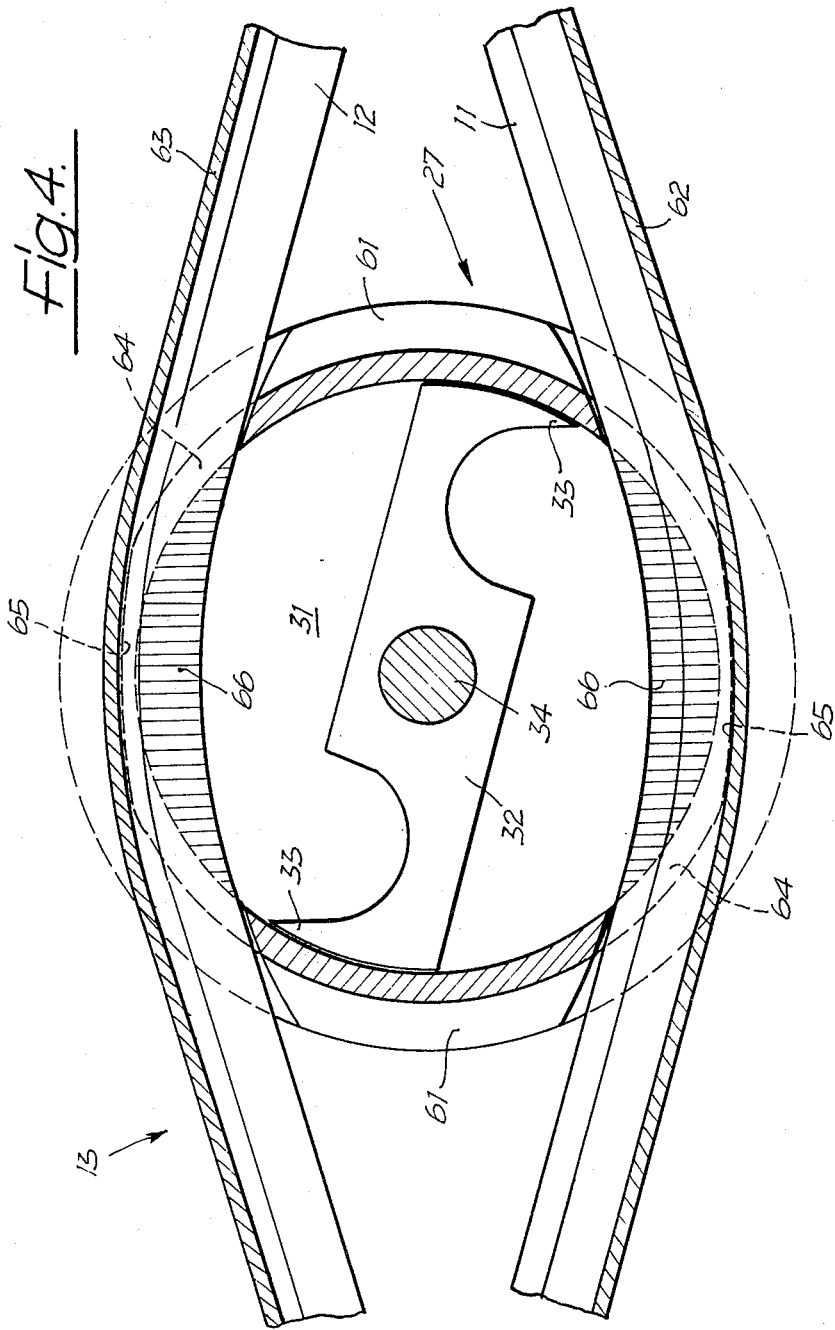

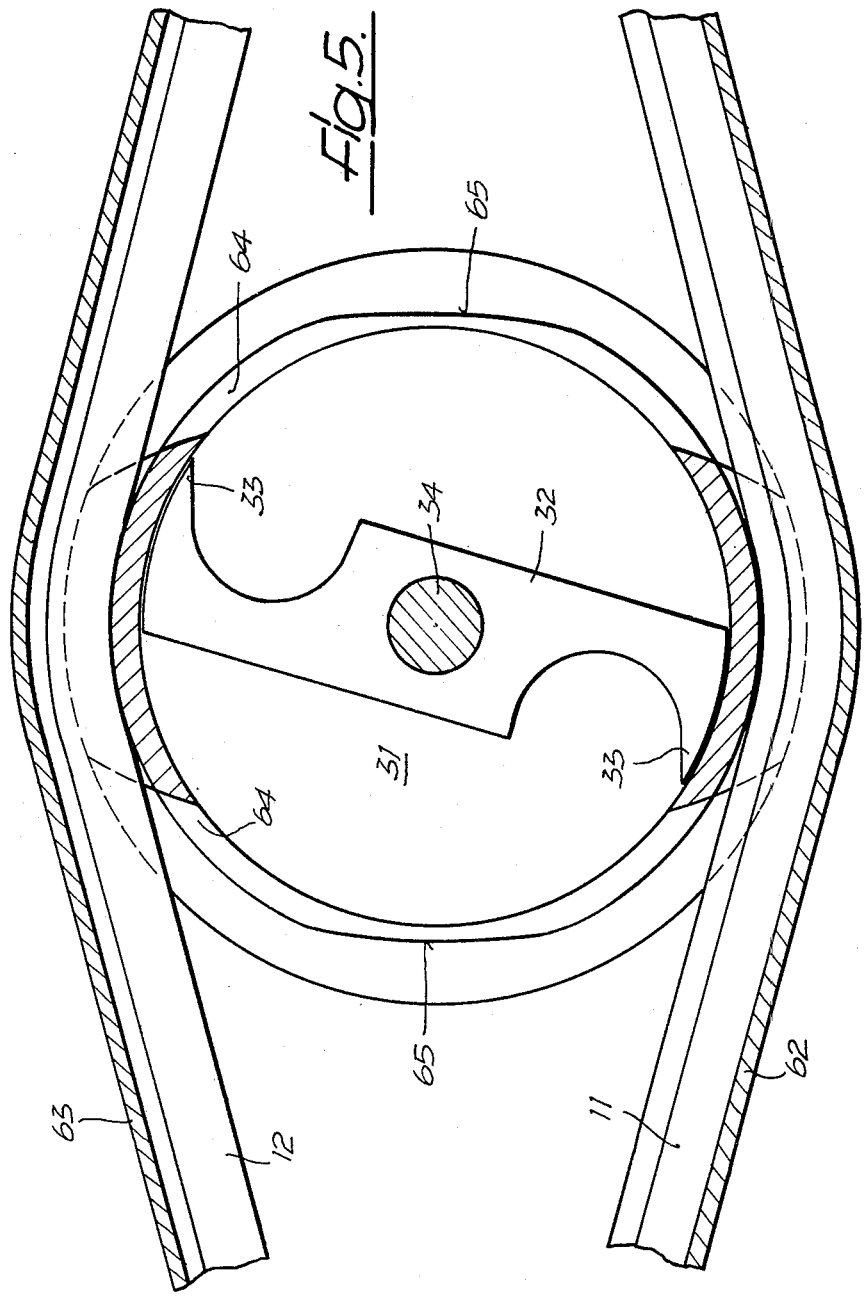

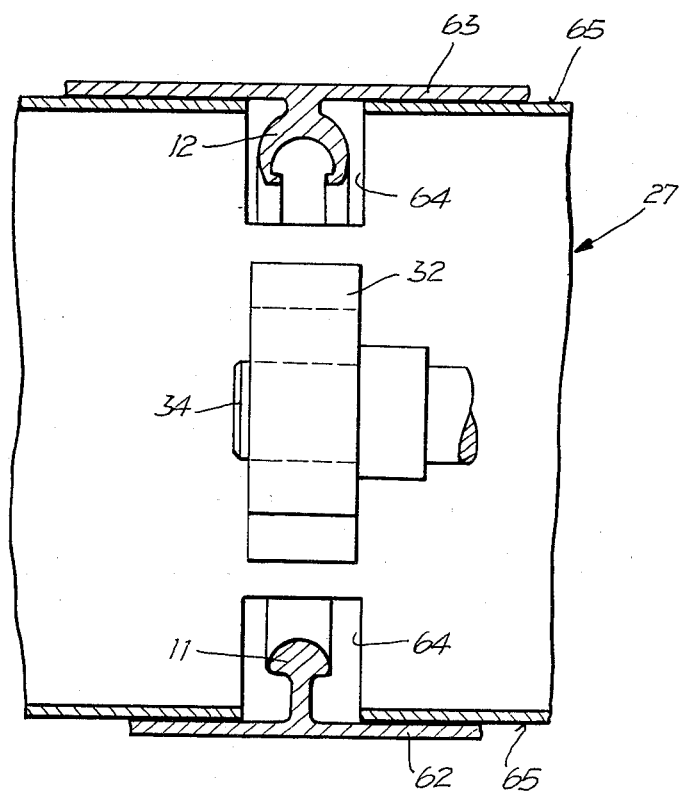

APPARATUS FOR FORMING BAGS OF THERMOPLASTIC MATERIAL

BACKGROUND OF THE INVENTION

This invention concerns an apparatus for manufacturing plastic bags from at least one double-ply thermoplastic sheeting both of the plies of which have closure strips formed on the facing inner edges so as to form a snap-fastener-like closure of the bag openings. The apparatus has a conveyor device which feeds the sheeting to a welding station in which a welding ledge, extending transverse to the direction of conveyance, separates the individual bags from the sheeting by separation welding.

The starting material for the manufacture of such bags is an extruded tube, on the inside of which the closure strips are producing during extrusion. The short side between the closure strips is cut open before the production of the bags so that an edge strip which forms a gripping piece is produced between each closure strip and the cut edge. The tube which has been cut open in this manner is generally referred to as a half-tube.

During manufacture of the bags the half-tube is pressed together flat such that the closure strips interengage, and the resulting closed half-tube is introduced into the welding station, where it is divided by separation welding into the individual bags by the welding ledge extending transverse to the direction of conveyance and thus transverse to the longitudinal axis of the half-tube.

When forming bags without closure strips, the separation welding process time is extremely short so that, with thin material, 250 welds per minute are possible. However, when forming bags with closure strips, the accumulation of material in the region of the closure strips must be cut through in the separation welding process. Much more time is required to melt through the thickness of the closure strips so that a substantially smaller number of bags can be welded per minute.

In order to increase the capacity of the aforementioned apparatus for the manufacture of plastic bags with closure strips it is known to deform the closure strips using heated press dies or ultrasonics at a station located upstream of the welding station so that the thickness of the closure strips at the point of welding is reduced to a value which can more easily be separated by welding. Other known methods include shortening the separating process in the region of the welding ledge by changing the cutting angle of the separating welding ledge.

All of these measures, however, are unsatisfactory and do not succeed in substantially improving the output per minute of the apparatus.

OBJECTS AND SUMMARY OF THE INVENTION

An object of the present invention is to provide an apparatus for the manufacture of plastic bags having snap-fastener-like closure strips which apparatus has an output per minute which is comparable with the apparatus for the manufacture of plastic bags without closure strips.

This object is achieved in accordance with the invention using a milling device which is arranged upstream of the welding station for milling a short segment of the closure strips corresponding to the location where welding will be performed. The milling device includes a milling tool which is movable from an inactive position into and out of an active position and an actuating device for controlling the milling device by moving the milling tool into the active position at a place on the sheeting corresponding to the location where separation-welding will be performed.

In this way, the greatest part of the closure strips in the region of the separation weld are milled away leaving substantially only the thickness of the sheeting itself to be melted, sealed and separated by separation welding. Thus separation welding is at most, only slightly impeded by the presence of the closure strips. With the apparatus of the invention, it is therefore possible to manufacture plastic bags with snap-fastener-like closure strips with the same or only slightly lesser production per minute than bags without closure strips.

In the apparatus for the manufacture of plastic bags from a double-ply thermoplastic sheeting by separation welding, the sheeting can be fed with a constant speed or else intermittently. In the former case, a welding ledge is employed for the separation welding which rotates with uniform velocity and, after completion of the welding, moves away from the sheeting with accelerated speed. Such devices can be developed in accordance with the invention, in which case the milling tool is brought into contact with the sheeting for such a short time that only very short pieces of the closure strips are milled off at the intended place of welding.

In the case of a conveyor device which conveys the sheeting intermittently, the milling device can, in one advantageous embodiment, comprise a continuously rotating milling tool which is rotatably supported within a mandrel which can be introduced between the two inner edges of the sheets. The milling device has guide grooves and openings for the closure strips at two diametrically opposite parts of its circumference and is rotatably supported on an axis and rotated by an actuating device during the standstill phase of the feed from an inactive position, in which the closure strips engage only the guide grooves, to an active position, in which the closing strips protrude through the openings into engagement with the milling tool whereby the closing strips are milled off. The milling device is arranged at a distance from the welding edge of the welding ledge which corresponds to the width of the bag or an integral multiple thereof.

The milling tool can rotate so rapidly that complete removal of the closure strips at the welding place is assured.

The above, and other objects, features and advantages of the present invention will become apparent from the following description read in conjunction with the accompanying drawings in which like reference numerals designate the same elements.

BRIEF DESCRIPTION OF THE DRAWINGS

FIG. 1 is a perspective view, partially broken away, of an extruded tube of sheeting with closure strips for the manufacture of plastic bags;

FIG. 2 is a schematic side view of the embodiment of the apparatus of the invention for the manufacture of plastic bags from the tube shown in FIG. 1;

FIGS. 4 and 5 are sections along the line IV—IV in FIG. 3 on a large scale, which show the milling device in its active and inactive position respectively; and FIG. 6 shows a portion on an enlarged scale of FIG. 3, showing the protrusion of the closure strips into the inside of the mandrel of the milling device.

DETAILED DESCRIPTION OF THE PREFERRED EMBODIMENT

Figure 3:
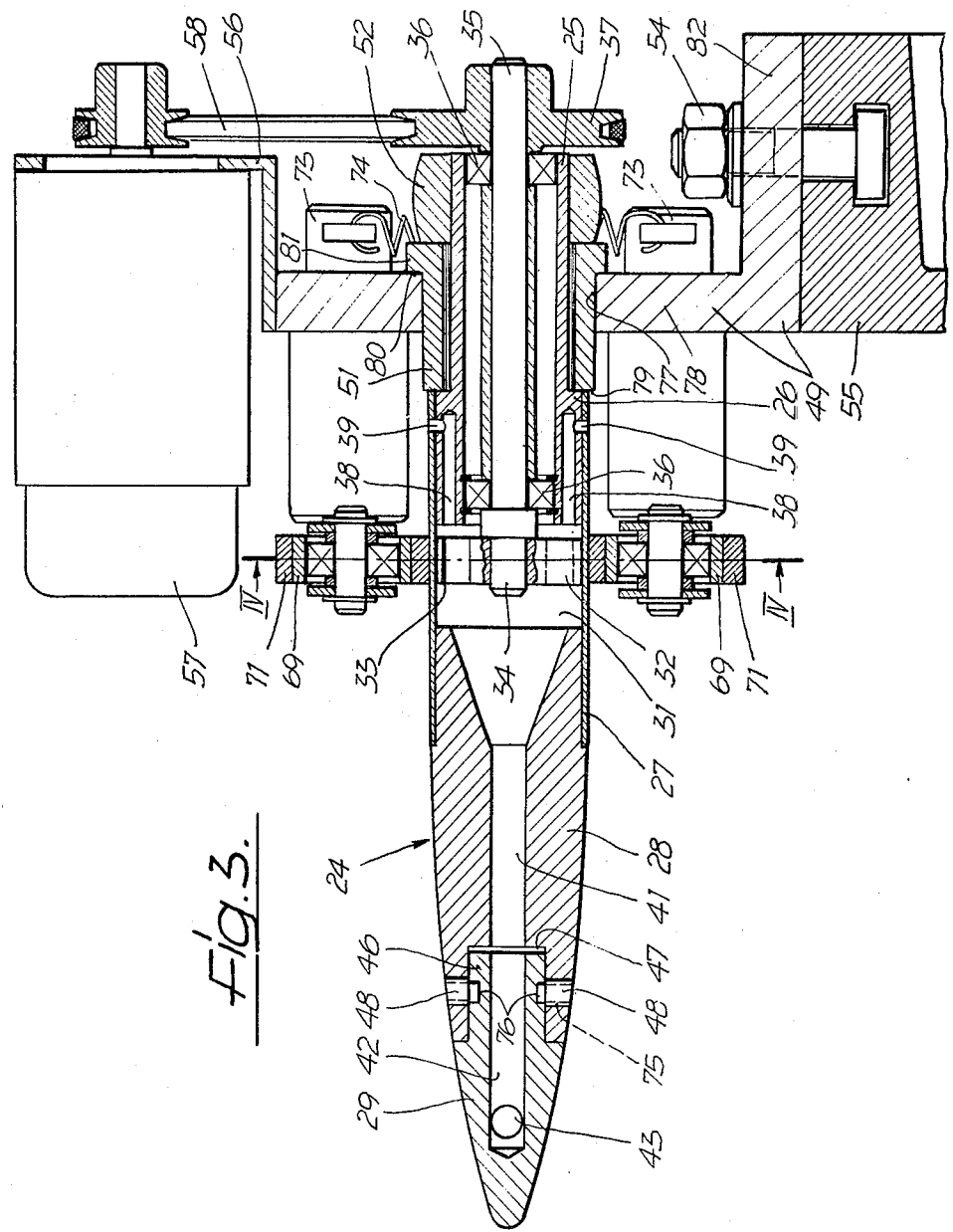
FIG. 3 is a vertical axial section through the milling device of the apparatus along the line III—III in FIG. 2.

The thermoplastic sheeting from which plastic bags having snap-fastener-like closure strips are to be manufactured with the apparatus described below is formed, in the embodiment shown in FIGS. 2–6, from a tube shown in FIG. 1 produced from a thermoplastic resin by extrusion, closure strips 11 and 12 being formed on the inner side of said tube upon its extrusion. For the snap-fastener-like interaction of these two closure strips the closure strip 11 forms the convex part. It can therefore also be referred to as a rib strip. The closure strip 12 forms the concave part and can therefore also be referred to as a groove strip. The development of these closure strips 11 and 12 is generally known so that more detailed description is unnecessary. As already mentioned above, however, the closure strips 11 and 12 have been shown greatly enlarged as compared with the actual proportions.

A side view is shown in FIG. 2 of an embodiment of the apparatus of the invention. The sheeting 13 formed from the tube of FIG. 1 is pulled off, by intermittently driven feed rollers 14, from a roll, not shown in the drawing. The tube shown in FIG. 1 is cut open along the cutting line 15 which lies between the two closure strips 11 and 12 so as to form a half-tube. The sheeting 13 is fed by the feed rollers 14 to a milling device, designated generally as 16, which has at its inlet two guide rollers 17 which hold the two closure strips 11 and 12 in engagement with each other. At the entry to the milling device, the closure strips 11 and 12 are separated to permit the milling operation to be performed. At the outlet of the milling device 16, the sheeting passes between a pair of pressure plates 18 which have an angled entry portion which look like sled runners and press the sheets together so that the closure strips 11 and 12 again engage with each other. Guide grooves (not visible in the drawing) in the pressure plates 18 guide the closure strips to ensure engagement therebetween.

After pressure plates 18, another pair of feed rollers 19 feed the sheeting 13 to a welding station, shown generally at 21, which has a welding ledge 22 extending transverse to the direction of conveyance and which is movable up and down to cooperate with a rubberized welding roller 23 in the known manner. A drive, not shown in the drawing, is provided in known manner both for the intermittent driving of the feed rollers 14 and 19 and for the upward and downward movement of the welding ledge 22. This upward and downward movement is synchronized in known manner with the intermittent feed so that the welding always takes place during the standstill phases of the intermittent feed.

In the welding station 21 the individual bags are separated by separation welding and then grasped by a bag delivery conveyor device formed of conveyor belts, not shown in the drawing.

The milling device 16 has a mandrel 24 shown in detail in FIG. 3, which has a collar sleeve 25 with a collar 26, a cylindrical tube 27, a conically shaped body 28, and a head 29. One end of the cylindrical tube 27 fits over the collar 26 of the collar sleeve 25 and its other end fits over the thicker end of the conical body 28 thereby connecting these parts to form a rigid body. The tube 27 surrounds a hollow space 31 in which a milling tool 32 having two cutters 33 rotates with the two cutters 33 moving along the cylindrical inner wall of the tube 27. The milling tool 32 is fastened to one end 34 of a shaft 35, which is rotatably supported by ball bearings 36 in the collar sleeve 25 which here forms the bearing housing for the shaft 35. A V-belt pulley 37 is fastened to the other end of the shaft 35 and protrudes out of the collar sleeve 25.

Milled chips of plastic material are removed from the hollow space 31 via an axial bore 41 in the conical body 28, an axial borehole 42 in the head 29 and a radial borehole 43 which may have a connection 44 (FIG. 2) for a suction air line 45. Atmospheric air enters the hollow space 31 via boreholes 38 in the collar 26 of the collar sleeve 25 and radial boreholes 39 passing through the tube 27 to the atmosphere. The head 29 is rotatable about a common axis with respect to the body 28. A cylindrical extension 46 of the head 29 is engaged in a cylindrical axial recess 47 in the body 28. For a rotatable connection of the head 29 with the body 28, radial threaded boreholes 75 in the body 28 receive threaded pins 48 whose inner ends engage circumferential annular groove 76 in the extension 76. This rotatable connection permits the head 29 to remain stationary while the remainder of the mandrel 24 rotates.

The mandrel 24 is rotatably supported in a bearing bushing 51 in a hole 77 in a first arm 78 of an angular supporting member 49. The collar sleeve 25 is rotatably supported in the bearing bushing 51. One end 79 of the bearing bushing 51 abuts the collar 26. An abutment surface 80 on a flange 81 on the other end of bearing bushing 51 abuts the perimeter of hole 77. A lug 52 of a lever 53 (FIG. 2) fastened to the collar sleeve 25 abuts the outer surface of flange 81. The second, horizontally arranged arm 82 of the supporting member 49 is connected by any convenient means, such as by screws 54, to the machine frame 55. A motor mount 56 which may conveniently be an angle iron, is attached to the upper end of the supporting member 49 in FIG. 3. An electric motor 57, attached to the motor mount 56, drives V-belt pulley 37 via a V-belt 58 and thus drives the milling tool 32 during operation at constant speed via the shaft 35.

As shown in the further detail in FIGS. 4 and 5, the tube 27 has guide grooves 61 in two diametrically opposite parts of its circumference for guiding the closure strips 11 and 12 of the two sheets 62 and 63 of the sheeting 13. Between grooves 61, in the circumference of the tube 27 there are openings 64 through which the closure strips 11 and 12 may protrude into the hollow space 31 and thereby enter into the region of action of the cutters 33 of the milling tool 32 when the tube 27 is rotated into the position in FIG. 4. By means of the lever 53, the mandrel 24 including the tube 27 can turn from the position shown in FIG. 5 in which the closure strips engage grooves 61, into the active position shown in FIG. 4 in which the closure strips 11 and 12 protrude through the openings 64 into the hollow space 31. Adjacent the openings 64, the outer wall of the tube 27 is flattened as shown at 65 in order to reduce the wall thickness. As a result of this thinning of the wall thickness in the region of the openings 64, nearly the entire height of the closure strips protrude into the hollow space 31 and can thus be milled by the milling tool 32 down practically to the facing surfaces of the sheets 62 and 63. The part 66 of the closure strips 11 and 12 which is removed by the milling tool 32 is shown hatched in FIG. 4. The removed plastic material is drawn out of the hollow space 31 through axial bore 41, axial bore 42 and radial bore 43 by the flow of air therethrough urged by suction air line 45 (FIGS. 2 and 3).

The distance between the axis of the shaft 35 of the milling device 16 and the welding edge 67 of the welding ledge 22 corresponds to the width of a bag or an integral multiple of this width.

A compressed air cylinder 68 is provided for the swinging of the lever 53, and thus for the turning of the mandrel 24 from the position shown in FIG. 5 into the active position of the milling device shown in FIG. 4 and back again. Immediately upon the commencement of the standstill phase, the compressed air cylinder 68 moves the lever 53 from the dotted line position shown in FIG. 2, in which the cylindrical tube 27 of the mandrel 24 is in the inactive position shown in FIG. 5, into the position shown in solid line in FIG. 2, in which the tube 27 is in the active position shown in FIG. 4. Shortly before the end of the standstill phase, the lever 53 is returned from the position shown in solid line in FIG. 3 into the dotted line position, in which the milling device 16 is in its inactive position.

In order to assure dependable engagement of the closure strips 11 and 12 both into the grooves 61 and also in particular into the openings 64, there are provided, above and below the tube 27, rollers 69 which have a rubber covering 71. Rollers 69 are rotatably supported at their free ends by levers 73 swingable about pins 72. A tension spring 74 on the two levers presses the rollers 69 against the tube 27.

During operation, the sheeting 13 is fed by the feed rollers 14 and 19 intermittently to the welding station 21. During the feed phase, the closure strips 11 and 12 slide through the guide grooves 61 of the tube 27, which is in its inactive position shown in FIG. 5. Immediately after the start of the standstill phase of the intermittent feed, the mandrel 24 and thus also the tube 27 are rotated by the compressed air cylinder 68 and the lever 53 from the position shown in FIG. 5 into the active position shown in FIG. 4, in which the closure strips 11 and 12 protrude through the openings 64 into the hollow space 31 of the tube 27 where the parts 66 thereof protruding into the hollow space are removed by the milling tool 32 which continuously rotates at constant speed. Since this milling takes place only during the standstill phases of the intermittent feed, the parts of the closure strips 11 and 12 which are milled off are located at a distance apart which corresponds precisely to the width of the bag which is sealed in the welding station 21. Due to the fact that the axis of the shaft 35 which bears the milling tool 32 is at a distance from the welding edge 67 of the welding ledge 22 which corresponds to the width of a bag or an integral multiple thereof, the welding always coincides with the location at which the closure strips 11 and 12 are most cut away so that the welding process is for all practical purposes not impaired by the closure strips. In order to change the width of bags produced, means (not shown) are provided for changing the distance between the milling device 16 and the welding ledge 22 and for locking the apparatus in this relationship. The distance of intermittent transport must also be appropriately changed.

The apparatus shown is intended for the manufacture of plastic bags with snap-fastener-like closure strips 11 and 12 made from a half-tube sheeting 13, as shown in FIG. 1. However, plastic tubes having two pairs of closure strips are also extruded. Such a tube is separated between the two pairs of closure strips so that two half-tubes in accordance with FIG. 1 lying alongside each other as mirror images are produced. For such double sheetings the apparatus shown can be very simply modified such that, after the cutting of the tube into two half-tubes, the two sheetings thus formed are moved somewhat apart and two mandrels 24, extending from a central supporting member toward opposite sides, engage the openings of the half-tubes facing them in the manner previously described. In this way two bags are produced simultaneously in so-called double use.

If the two pairs of closure strips are located diametrically opposite each other on the tube, the tube is separated by longitudinal separation-welding in its center into two half tubes. As a result of such separation-welding, the two sheets are welded together to form bag bottoms. This produces two half-tubes in accordance with FIG. 1, the bottoms of which lie against each other. These two half-tubes may each be treated with a device similar to the device described except having a pair of mandrels directed toward each other which protrude into the outwardly directed openings of the two half-tubes.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What we claim is:

1. An apparatus for the manufacture of plastic bags from half-tubes of at least one double-ply thermoplastic sheeting the two plies of which bear closure strips on facing inner edges thereof, to form a snap-fastener-like closure of the bag openings comprising:
    a welding station having a welding ledge which extends transversely to the direction of conveyance separating the individual bags from the sheeting by separation-welding;
    conveying means for feeding said sheeting to said welding station;
    a milling device upstream of said welding station;
    means for intermittently engaging said milling device with said closure strips whereby facing portions of said closure strips are milled off; and
    means for aligning said thermoplastic sheeting with said welding ledge at the location where said closure strips have been milled off.

2. An apparatus according to claim 1, further comprising suction means in said milling device for removal of milled portions of said closure strips.

3. An apparatus according to claim 1, wherein said milling device includes:
    a mandrel having a hollow space therein;
    intermittent conveying means for intermittently conveying said thermoplastic sheeting;
    a continuously rotating milling tool in said mandrel rotatably supported in said hollow space;
    said mandrel being located between the two inner edges of said thermoplastic sheets;
    guide grooves for guiding said closure strips in two diametrically opposite parts of the circumference of said mandrel;
    two diametrically opposed openings in said mandrel angularly displaced from said guide grooves;

means for rotating said mandrel whereby said closure strips are moved into and out of engagement with said milling tool through said openings; and said mandrel being arranged at a distance from said welding ledge equal to an integral multiple of the width of a bag.

4. An apparatus according to claim 3, wherein a head at the free end of said mandrel is rotatable about an axis of said mandrel and said head includes a connection for a suction air line for the drawing off of milled material, said connection being connected via an axial borehole with said hollow space in said mandrel.

5. An apparatus according to claim 3, further comprising means for displacing said milling device in the direction of feed of the sheeting and for locking it in position for adaptation to different widths of bags.

6. An apparatus according to claim 3, further including flattened areas on an outer wall of said mandrel adjacent said openings.

7. An apparatus according to claim 3, wherein said milling tool includes at least two diametrically opposite cutters rotatable along a cylindrical inner wall of said hollow space of said mandrel.

8. An apparatus according to claim 1, further comprising opposed pressure plates having grooves in the region of said closure strips for engaging said closure strips of said two sheets downstream of said milling device prior to welding.

9. An apparatus according to claim 1, further comprising spring-loaded pressing rollers operative to press said two sheets against said milling device.

10. An apparatus according to claim 3, wherein said engagement means includes a lever fastened to said mandrel and a compressed air cylinder operative to intermittently actuate said lever.

* * * * *